Nov. 5, 1935.  R. STEVENSON  2,019,513
MOUNTING FOR OSCILLATING MEMBERS
Filed June 8, 1933  3 Sheets-Sheet 2
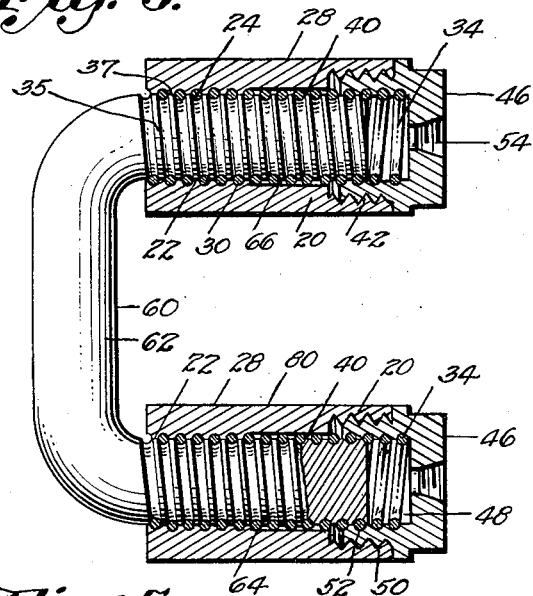
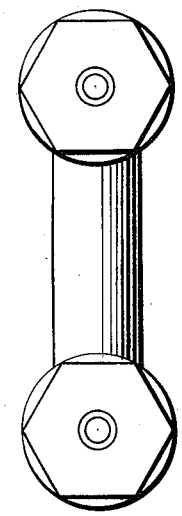
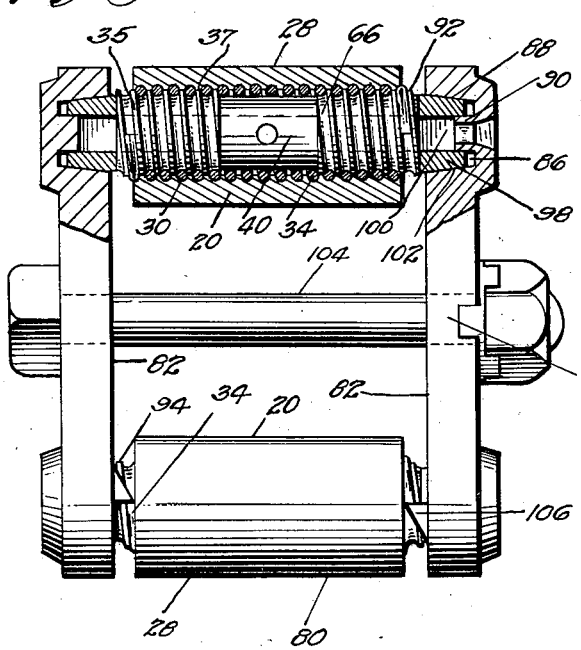
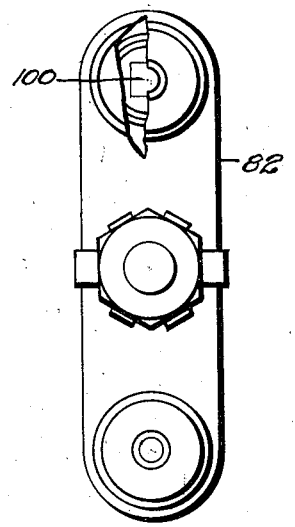
INVENTOR
Robert Stevenson
BY Thomas A. Junckes
ATTORNEY Nov. 5, 1935.          R. STEVENSON          2,019,513
MOUNTING FOR OSCILLATING MEMBERS
Filed June 8, 1933          3 Sheets-Sheet 3
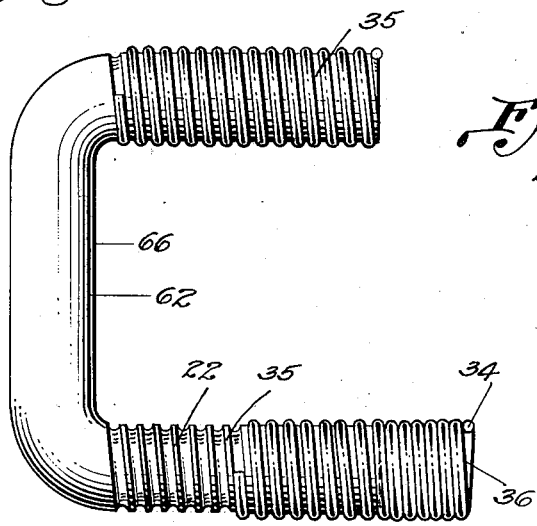
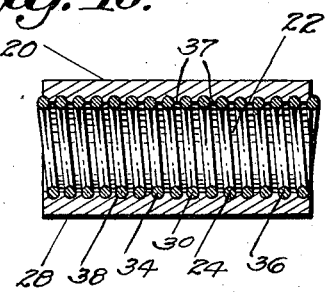
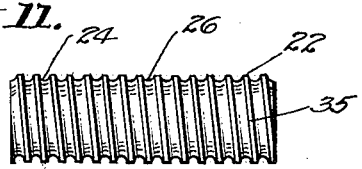
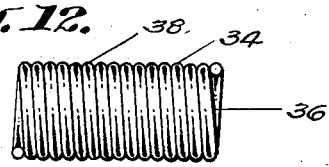
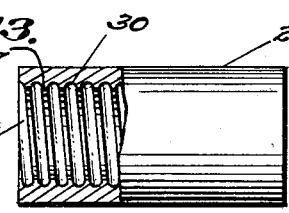
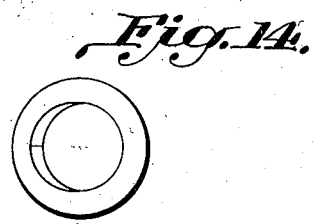
INVENTOR
Robert Stevenson
BY Thomas A. Jember
ATTORNEY Patented Nov. 5, 1935

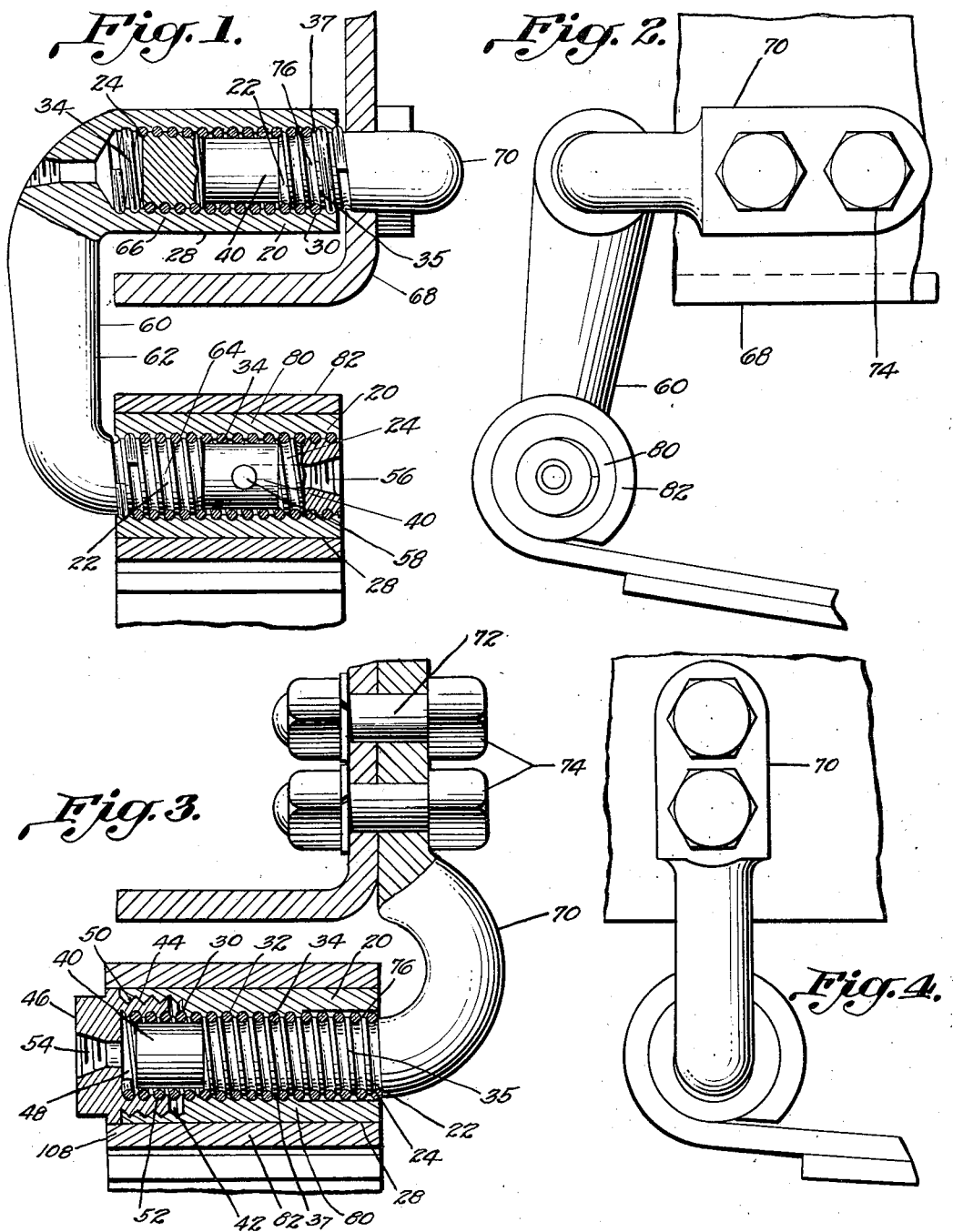

2,019,513

UNITED STATES PATENT OFFICE 2,019,513

MOUNTING FOR OSCILLATING MEMBERS

Robert Stevenson, West Barrington, R. I., assignor to Edwin Harris, Pawtucket, R. I.

Application June 8, 1933, Serial No. 674,818

20 Claims. (Cl. 267—54)

My invention relates to improvements in mountings for oscillating members and specifically the oscillating member of a spring shackle, whether the shackle consists of a single oscillating mounting or two oscillating mountings, one for the chassis and one for the spring, each of which types are common and well-known in the art.

An object of my invention is to provide an automatic spring take-up for oscillating mountings of this type to thereby eliminate side back-lash and play.

A further object of my invention inherent in the compact spring construction thereof is that the expanded or tensioned spring normally tends to contract or work itself out of tension and make the mounting self-adjusting.

A further object of my invention due to the inherent construction of the mounting is to evenly distribute the wear. In the preferred embodiment of my invention I provide spaced rounded helical grooves in cooperating cylindrical bolt and hollow bearing mounting members and due to the fact that I employ the rounded grooves, it is obvious that the wear will be more evenly distributed thereover than in the case of a V-shaped or pointed standard common threaded bearing.

So far as I am aware I am the first to provide an extended spring especially one having a rounded outer surface in an oscillating mounting of this type.

A further advantage of my invention is that I provide a novel type of bearing for an oscillating member particularly adapted for use in a spring shackle, simple to make, relatively stronger and for a more easy assembly than any hitherto known, and due to the fact that I distribute the most of my wear on a metallic spring, it is possible to make the metal in the spring a much harder material and of a much longer life than has been hitherto employed in the connecting bolt and bearing of an oscillating mounting.

Further features of my invention relate to the specific constructions of the mountings and shackle connections I employ and specifically to the type of locking screw cap for locking the mounting in place which may be of different pitch than that of the helical goove containing the spring in both cooperating mounting members to lock said mountings and adjust the tension exerted by the spring.

These and such other objects of my invention as may hereinafter appear will be best understood by a description of the accompanying drawings which illustrate various embodiments of my improved mountings specifically applied to various types of spring shackles.

In the drawings, Fig. 1 is an end elevation partially shown in section of a specific type of double spring shackle employing my invention on each point of connection thereof.

Fig. 2 is a side elevation of the embodiment of my invention shown in Fig. 1 attached to a chassis.

Fig. 3 is an end elevation partially shown in section of a different embodiment of my invention attached to a single spring shackle mounted on the chassis of a vehicle such as adapted for use in the front end of an automobile.

Fig. 4 is a side elevation of the embodiment shown in Fig. 3.

Fig. 5 is an end elevation partly shown in section of a different embodiment of a double ended shackle in which my invention may be employed.

Fig. 6 is a side elevation of the embodiment shown in Fig. 5.

Fig. 7 is an end elevation partly shown in section of a further embodiment of spring shackle in which my invention may be employed, employing side shackle plates in addition to the shackle bolts and bearings.

Fig. 8 is a side elevation of the embodiment shown in Fig. 7.

Figs. 9 to 14 show various parts of my improved type of mountings per se, Fig. 9 being a side elevation of the improved type of U-shaped shackle member I employ in the preferred embodiment thereof provided with the spaced helical grooves of my invention and illustrating how the spring is mounted thereon in distended form by the spacings of the grooves, Fig. 10 being a longitudinal sectional view taken through one of my improved mountings, Fig. 11 being a side elevation of a cylindrical bolt mounting member, Fig. 12 being a side elevation of the spring I employ for the interconnecting means in contracted position, Fig. 13 being a side elevation partially broken away of my improved hollow bearing member and Fig. 14 being an end elevation of the mounting shown in Fig. 10.

In the drawings, wherein like characters of reference indicate like parts throughout, 20 generally indicates an improved mounting for an oscillating member constructed in accordance with my invention. My invention includes a stationary member and a member adapted to oscillate thereon. One of said members in the embodiment shown in Figs. 9–14 and more often employed by me as the oscillating member comprises a cylindrical member 22 having spaced helical groove means 24 thereon rounded as at 26 on the periphery thereof, and the other of said members 28 comprises a hollow bearing member as shown in Figs. 9–14 also having similarly spaced helical groove means 30 of the same pitch as the helical groove means in the cylindrical member on the inner periphery 32 thereof, and I employ a closely wound helical spring 34 having a rounded inner and outer periphery 36 and 38 respectively and adapted to be screwed on or mounted in between said members in extended form to have the inner and outer respective surfaces 36 and 38 thereof, threaded within each of said rounded groove means 32 and 24 respectively on the hollow and cylindrical members. While the groove means 24 and 32 are preferably rounded as at 26, it is obvious that they may be of any desired shape and the cooperating spring surfaces 36 to 38 may be similarly shaped. I preferably form the grooves 32 and 24 so deep and construct the spring 34 of such a size as to provide additional bearing surfaces 35 and 37 on the cylindrical and hollow members respectively between said grooves. As the spring 34 is expanded or distended in use as it becomes threaded in between the members it is obvious it will always have a tendency to contract and bear against the inner portions of said grooves relative to a center to automatically take up any wear and equalize and distribute the wear over the entire periphery of the grooves and tending to contract toward its center tends to eliminate side back lash and play. If desired, as shown in Figs. 1, 3, 5 and 7, one of said members may have said respective grooves 24 and 32 extend for a portion of the length thereof only within said hollow member leaving a plain bearing surface 40 for the spring surface for the balance of the engaging length of said cylindrical and hollow members, on one of said members, in the embodiments shown in Figs. 1 and 7 being in the center portion thereof and on the cylindrical member, in the embodiments shown in Fig. 5 being in the center portion thereof and on the hollow member and in the embodiment shown in Fig. 3 being on the end thereof on the cylindrical member. Inasmuch, therefore, as there is no interengagement over this plain bearing surface, it is obvious that the spring may move relative thereto to provide a more freer expansion and contraction and a more automatic take up for the threaded portions. I may also if desired as shown more particularly in Figs. 3 and 5, provide said bearings with a take up or locking cap and for this purpose I provide the hollow member with an enlarged inner periphery 42, near an end thereof and provide the threaded seat 44 therein if desired with threads of different pitch from that of said rounded grooves 32 and I provide an adjustable locking cap 46 having a hollow inner end 48 with the outer periphery 50 thereof cooperatingly threaded for engagement with said threads 44 on the outer end of said hollow member and its inner periphery having spaced rounded groove means 52 of the same or different pitch as that of the groove means 32 on the balance of said hollow member for reception of said spring, whereby the expansion of said spring may be adjustably regulated.

If desired in any of the embodiments shown the cap 46 may be provided with an axial oil hole 54 as shown in Figs. 3–5, or if desired as in the embodiment shown in Fig. 1, the end of the cylindrical member may be provided with an oil hole 56 provided with a radial extension 58 so that oil may be fed around the cooperating bearing surfaces.

While it is obvious that my improved mounting may be employed for any type of a member oscillating on a stationary member, it is particularly adapted for use in the spring shackles of a motor or other vehicle such as a railroad car, airplane, automobile, machinery, etc. I have shown in Figs. 1 and 5 a type of double shackle such as is often employed on the rear end of an automobile. In the embodiment shown the shackle member itself comprises a U-shaped shackle member 60 including the shackle connecting portion 62 and the lower and upper bolt arm extensions 64 and 66. To mount the upper bolt extension 66 on the chassis 68 I provide a cooperating mounting forming hanger 70 adapted to be secured on said chassis and forming with said upper extension 66 an upper shackle oscillatable mounting. In the embodiments shown said hanger includes the head 70 thereof provided with bolt holes 72 adapted to secure through the bolts 74, said head 70 to the chassis, and the base thereof is provided with a shackle extension 76. The upper shackle mounting as shown in Figs. 1 and 5 has my invention attached thereto. Either a cylindrical bolt portion 24 may project from a hanger as shown in Fig. 1 and the hollow portion 28 may comprise a threaded extension 66 of said U-shaped member 60 or as in the embodiment shown in Fig. 5 the hollow portion 30 may be secured directly to the chassis and the cylindrical bolt portion 24 may consist of the threaded extension 66 of said bolt arm extension. In all embodiments where a doubly pivoted shackle is employed the lower mounting 64 also has my invention attached thereto and the cylindrical bolt portion 22 thereof comprises an extension of the shackle bolt or hanger itself and the hollow portion comprises a bearing 80 adapted to be non-rotatably secured with a spring end 82. In the embodiment shown in Fig. 5 the upper extension 66 is directly mounted on a hollow bearing 30 directly mounted on the chassis in any suitable manner not shown. I have shown in Figs. 7 and 8 a type of double ended shackle employing my improved oscillating mounting on each end thereof, including the side shackle plates 82. In this embodiment the side shackle plates 82 are provided with a central hole 84 and with annular holes 86 near each end thereof provided with a circular preferably tapered outer periphery 88 and a square inner periphery 90. The upper and lower shackle bolts 92 and 94 comprising the cylindrical portions of my invention are provided with the outer ends 98 having a square hollow center 100 and tapered round outer periphery 102, whereby the outer ends of said bolts may lie and fit in said annular holes 88 of said shackle plates to retain said bolts 94 and 92 against rotation thereon to thus provide the rigid rectangular shackle frame made up of the side plates 82 and shackle bolts 94 and 96. I also provide suitable means such as the bolt 104 to secure said side plates 82 together.

The hollow portions 30 of this embodiment of my invention comprise the threaded bearings 30, the upper of which is adapted to be secured to the chassis and the lower of which is adapted to be secured to the spring end. The side plates 82 may, if desired, be provided with the integral lugs 106 projecting inwardly therefrom adapted to abut respectively the ends of the springs 34 to secure them against rotation on the cylindrical bolt members.

In place of providing a double ended shackle I may as shown in Figs. 3 and 4 employ a shackle having a single end in which the shackle member itself comprises the hanger 70 which may be generally similar to the hanger 70 heretofore described having the shackle bolt extension 66 which forms the cylindrical bolt portion 24 of my improved oscillatable mounting, the hollow portion 30 thereof comprising a bearing around which a spring end 108 is adapted to be nonrotatably secured. It is apparent therefore that I have provided a novel type of mounting for oscillatable members adapted for use broadly in machinery, specifically designed to be used in a double or single pivoted shackle for automobiles or other types of vehicles with the advantages portrayed above.

It is understood that my invention is not limited to the specific embodiments shown and that various deviations may be made therefrom without departing from the spirit and scope of the appended claims.

What I claim is:

1. In combination, a member and a member mounted thereon to swingably oscillate through an arc relative thereto, one of said members having a cylindrical bearing portion having spaced rounded helical groove means on the periphery thereof and the other of said members having a bearing bore to receive said cylindrical bearing portion, also having similarly spaced rounded helical groove means of the same pitch on the inner periphery thereof, and a round helical spring in tensioned form threaded within each of said rounded groove means.

2. In combination, a member and a member mounted thereon to swingably oscillate through an arc relative thereto, one of said members having a cylindrical bearing portion having spaced helical groove means on the periphery thereof and the other of said members having a bore to receive said cylindrical portion also having similarly spaced helical groove means of the same pitch on the inner periphery thereof and a helical spring in tensioned form threaded within each of said groove means.

3. In combination, a member having a portion having a cylindrical bore having spaced helical groove means thereon and a member having a cylindrical portion mounted within said bore to swingably oscillate through an arc relative thereto having similarly spaced helical groove means on the outer periphery thereof and a closely wound helical spring in extended form threaded within each of said groove means.

4. In combination, a bearing member having a portion having a cylindrical bore having spaced helical grooves thereon and a member having a cylindrical portion mounted within said bore to swingably oscillate through an arc relative thereto, having similarly spaced helical grooves on the outer periphery thereof and a helical spring in tensioned form threaded within each of said grooves, the grooves being so deep and the spring of such a size as to provide additional bearing surfaces on said members between said grooves.

5. In combination, a stationary member and a member adapted to oscillate thereon, one of said members being a cylindrical member having spaced rounded helical groove means on the periphery thereof and the other of said members being a hollow member also having similarly spaced rounded helical groove means of the same pitch on the inner periphery thereof and a closely wound round helical spring in extended form threaded within each of said rounded groove means, one of said members having said groove means extended for a portion of the length thereof within said hollow member only leaving a plain bearing surface for the balance of the engaging length thereof.

6. In combination, a stationary member and a member adapted to oscillate thereon, one of said members being a cylindrical member having spaced helical groove means on the periphery thereof and the other of said members being a hollow member also having similarly spaced helical groove means of the same pitch on the inner periphery thereof and a closely wound helical spring in extended form threaded within each of said rounded groove means, one of said members having said groove means at each end thereof within said hollow member only leaving a plain bearing surface thereon.

7. In combination, a stationary member and a member adapted to oscillate thereon, one of said members being a cylindrical member having spaced helical groove means on the periphery thereof and the other of said members being a hollow member also having similarly spaced helical groove means of the same pitch on the inner periphery thereof and a closely wound helical spring in tensioned form threaded within each of said grooves, one of said members having said grooves extended for a portion of the length thereof within said hollow member only leaving a center plain bearing surface thereon, said hollow member having an enlarged inner periphery near an end thereof and a threaded seat therein with threads of different pitch from said groove means and an adjustable locking bolt having a hollow inner end having its outer periphery cooperatingly threaded for engagement with said threads on the outer end of said hollow member and its inner periphery having spaced groove means for reception of said spring, whereby the expansion of said spring may be adjustably regulated.

8. In combination, a stationary member and a member adapted to oscillate thereon, one of said members being a cylindrical member having spaced helical groove means on the periphery thereof and the other of said members being a hollow member also having similarly spaced helical groove means of the same pitch on the inner periphery thereof and a closely wound helical spring in tensioned form threaded within each of said grooves, said hollow member having an enlarged inner periphery near an end thereof and a threaded seat therein with threads of different pitch from said groove means and an adjustable locking bolt having a hollow inner end having its outer periphery cooperatingly threaded for engagement with said threads on the outer end of said hollow member and its inner periphery having spaced groove means for reception of said spring, whereby the tension of said spring may be adjustably regulated.

9. In a spring shackle, a shackle hanger bolt having a head detachably securable to a chassis and a horizontally extending bolt having spaced helical groove means on the periphery thereof and a shackle bushing adapted to be nonrotatably held in a spring end having spaced helical groove means on the inner periphery thereof of the same pitch as said bolt groove means and a closely wound helical spring in extended form threaded within each of said groove means, said bushing member having an enlarged inner periphery near an end thereof and a threaded seat therein with threads of different pitch from said groove means and an adjustable locking bolt having a hollow inner end having its outer periphery cooperatingly threaded for engagement with said threads on the outer end of said bushing member and its inner periphery having spaced female groove means for reception of said spring, whereby the expansion of said spring may be adjustably regulated.

10. In combination, a unitary shackle member having a pair of bolt arm extensions integrally joined together at one end thereof, a cooperating hanger adapted to be secured to a chassis forming with said upper extension, an upper shackle oscillatable mounting, a cooperating bushing adapted to be secured to a spring end forming with said lower extension, a lower shackle oscillatable mounting, one mounting member in each of said mountings being a cylindrical member having spaced helical female groove means on the periphery thereof and the other of said members being a hollow member also having similarly spaced helical groove means of the same pitch on the inner periphery thereof and a closely wound helical spring in extended form threaded within each of said rounded groove means, one of said members having said grooves extended for a portion of the length thereof within said hollow member only leaving a plain bearing surface for the balance of the engaging length thereof.

11. In combination, a unitary shackle member having a pair of bolt arm extensions integrally joined together at one end thereof, a cooperating hanger adapted to be secured to a chassis forming with said upper extension an upper shackle oscillatable mounting, a cooperating bushing adapted to be secured to a spring end forming with said lower extension a lower shackle oscillatable mounting, one mounting member in each of said mountings being a cylindrical member having spaced helical groove means on the periphery thereof and the other of said members being a hollow member also having similarly spaced helical groove means of the same pitch on the inner periphery thereof and a closely wound helical spring in extended form threaded within each of said groove means, said hollow member having an enlarged inner periphery near an end thereof and a threaded seat therein with threads of different pitch from said groove means and an adjustable locking bolt having a hollow inner end having its outer periphery cooperatingly threaded for engagement with said threads on the outer end of said hollow member and its inner periphery having spaced groove means for reception of said spring, whereby the expansion of said spring may be adjustably regulated.

12. In a spring shackle, side shackle plates having annular holes at the top and bottom thereof having a circular tapered outer periphery and a square inner periphery, upper and lower hollow shackle bolts having a square hollow center and tapered round outer ends whereby the outer ends of said bolts may lie in said annular holes in said shackle plates to retain said bolts against rotation, each of said bolts having a smooth center portion and spaced helical groove means on the outer periphery thereof near each end thereof, hollow shackle bushings, each having similarly spaced helical groove means of similar pitch on the inner periphery thereof and a closely wound helical spring in extended form threaded within each of said helical grooves, said plates each having lugs projecting inwardly therefrom adapted to abut each respective spring end.

13. In a spring shackle, side shackle plates, upper and lower shackle bolts having the ends thereof non-rotatably mounted on the upper and lower ends of said plates, a smooth center portion and a spaced helical rounded groove on the outer periphery thereof near each end thereof, hollow shackle bushings, each having a similarly spaced rounded helical groove of similar pitch on the inner periphery thereof and a closely wound round helical spring in extended form threaded within each of said rounded helical grooves.

14. In a spring shackle, side shackle plates, upper and lower hollow shackle bolts having the ends thereof nonrotatably mounted on the upper and lower ends of said plates, and spaced helical grooves on the outer periphery thereof, hollow shackle bushings, each having a continuous helical groove of similar pitch on the inner periphery thereof and a closely wound helical spring in extended form threaded within each of said helical grooves.

15. In combination, a member having a bearing portion, a second member having a bearing portion mounted thereon to swingably oscillate through an arc relative thereto, the bearing portion of one of said members comprising a grooved bearing surface, said groove being in the form of a true helix, cooperating bearing means interposed between the bearing portions of said members comprising a helically coiled spring threaded into said groove for relative oscillation therein, and having a portion thereof secured to the other of said members against axial movement thereon.

16. In combination, a helically coiled spring, having hard wear resisting inner and outer bearing surfaces, a member having a bearing surface comprising a helical groove, said spring being threaded into and bearing in said groove, a second member having a bearing surface adapted to abut the opposite spring bearing surface to provide a mounting, for mounting one of said members on the other to permit swingable oscillation thereof through an arc relative thereto, said spring having a portion thereof secured to said second member against axial movement thereon.

17. In combination, relatively oscillatable members comprised of a hollow member and a second member extending within said hollow member, said members being provided with complementary, opposed helical bearing grooves, a helically coiled wire formed of hard, wear-resisting material, said wire being threaded into both of said bearing grooves, and means for retaining said wire within said grooves.

18. In combination, a member and a member mounted thereon to swingably oscillate through an arc relative thereto, one of said members having a cylindrical bearing portion having spaced helical groove means on the periphery thereof and the other of said members having a bearing bore to receive said cylindrical bearing portion also having similarly spaced helical grooove means of the same pitch on the inner periphery thereof and a helical spring threaded within each of said groove means.

19. In combination, a member having a portion having a cylindrical bore having spaced rounded helical groove means thereon, and a member having a cylindrical portion mounted within said bore to swingably oscillate through an arc relative thereto, having similarly spaced rounded helical groove means on the outer periphery thereof and a closely wound round helical spring threaded within each of said rounded groove means.

20. In combination, a member having a portion having a cylindrical bore having spaced helical grooves thereon and a member having a cylindrical portion mounted with said bore to swingably oscillate through an arc relative thereto, having similarly spaced helical grooves on the outer periphery thereof and a closely wound helical spring threaded within each of said grooves, the grooves being so deep and the spring of such a size as to provide additional bearing surfaces on said members between said grooves.

ROBERT STEVENSON.